United States Patent [19]

Baumgartner et al.

[11] Patent Number: 4,819,375

[45] Date of Patent: Apr. 11, 1989

[54] AQUAPOT

[76] Inventors: Norbert Baumgartner, R.R. 5, Belwood, Ontario N0B 1J0; David E. Elrick, 27 Vardon Dr., Guelph, Ontario, N1G 1W8; W. Daniel Reynolds, 271 Grange St., Guelph, Ontario, N1E 6R5, all of Canada

[21] Appl. No.: 837,735

[22] Filed: Mar. 10, 1986

[51] Int. Cl.$^4$ .............................................. A01G 25/00
[52] U.S. Cl. ...................................... 47/80; 137/78.3
[58] Field of Search ...................................... 47/79–81; 137/78.3

[56] References Cited

U.S. PATENT DOCUMENTS

| 126,112 | 4/1872 | von Levetzow | 47/80 |
| 1,222,648 | 4/1917 | Marks | 47/80 X |
| 2,445,717 | 7/1948 | Richards | 47/80 |
| 3,758,987 | 9/1973 | Crane | 47/80 |
| 4,083,147 | 4/1978 | Garrick | 47/80 |
| 4,542,762 | 9/1985 | Littlehale | 47/79 X |

FOREIGN PATENT DOCUMENTS 2509724  9/1976  Fed. Rep. of Germany .......... 47/79

*Primary Examiner*—Robert E. Bagwill
*Attorney, Agent, or Firm*—Sim & McBurney

[57] ABSTRACT

An upwardly open receptacle for plants includes a bottom wall, a reservoir adjacent the receptacle and having an opening at the bottom in communication with a membrane in the bottom of the receptacle, and a compartment in operative relation with the reservoir. The compartment has a first conduit communicating the atmosphere with a first location within the compartment, and a second conduit communicating a second location within the compartment with the location in the reservoir adjacent the lower region of the receptacle. The second location is above the first location. The compartment is adapted to contain liquid to a level between the two locations, and is sealed from the atmosphere except for the first-mentioned conduit.

11 Claims, 1 Drawing Sheet 4,819,375

AQUAPOT

This invention relates generally to receptacles for containing plants or the like, and has to do particularly with a receptacle adapted to provide water in a controlled manner to a contained plant.

BACKGROUND OF THIS INVENTION

There exists a well-known principle by which water or any liquid can be metered in a controlled fashion into a container or into the ground. This is called the "Marriotte" principle and is utilized in British Patent No. 874,729, issued Aug. 10, 1961 to R. C. Bracey. In FIG. 2 of the said patent there is shown a simplified "Marriotte" construction in which a plant receptacle is adjacent a water compartment that is sealed at the top and has an opening toward the bottom communicating with the receptacle. A tube provides communication between the atmosphere and a location in the compartment which is below the level of water in the compartment. This means that, within the compartment, the level of atmospheric pressure is at the bottom of the tube, and the water above this level is at a pressure below atmospheric. In this prior art patent, the opening into the plant receptacle is approximately at the same horizontal level as the bottom of the tube. As water passes out of the compartment through the opening and into the plant receptacle, air enters from the atmosphere through the tube to replace the removed water. In effect, this principle provides a constant-level "water table" within the plant receptacle.

Other prior art patents of interest are U.K. Patent No. 14,554, issued Dec. 12, 1907 to Gelezius; Canadian Patent No. 951,516, issued July 23, 1974 to Crane; and Canadian Patent No. 961,641, issued Jan. 28, 1975 to Crane.

While the Marriotte system shown in British Patent No. 874,729 provides in many cases a satisfactory watering system for plants, there are numerous instances in which the establishment of the top of an effective water table within a plant receptacle, whether constant or not, does not represent an ideal situation. In fact, most plants, miniature trees, etc. in nature do not grow in conditions where the water table is found only a few inches below the surface of the ground. For many species, such conditions represent over-watering and could lead to poor growth or the death of the plant.

A far more realistic condition is one in which the top of the effective water table is located some distance below the roots of the plant, in order to avoid over-watering. However, with the ordinary Marriotte system, this can be accomplished only by increasing the vertical depth of the receptacle, and ensuring that the bottom of the air-admitting tube in the water compartment is located adjacent the very bottom of the deep receptacle. Clearly, this is not a practical solution to the problem.

GENERAL DESCRIPTION OF THIS INVENTION

Accordingly, it is the object of an aspect of this invention to provide a water-metering system specially suited for the care of plants, in which an effective water table level can be located below the bottom of the plant receptacle, without the necessity of deepening the receptacle. In fact, the effective level of the water table can be, in most cases, below a solid surface on which the plant receptacle is supported.

In general, this is accomplished by a sophisticated improvement of the Marriotte principle, involving the series-coupling of two pressure-reducing systems.

More particularly, this invention provides, in combination:

means defining an upwardly open receptacle for plants or the like, said means including a bottom wall for the receptacle, a reservoir adjacent the receptacle, having an opening at the bottom in communication with the bottom of the receptacle, and a compartment having a first conduit communicating the atmosphere with a first location within the compartment, and a second conduit communicating a second location within the compartment with a location in the reservoir adjacent the lower region of the receptacle, said second location being above said first location, said compartment being adapted to contain liquid to a level between the two said locations, the compartment being sealed from the atmosphere except for said first conduit.

GENERAL DESCRIPTION OF THE DRAWINGS

One embodiment of this invention is illustrated in the accompanying drawings, in which like numerals denote like parts throughout the several views, and in which:

FIG. 1 is a vertical, axial sectional view through a plant receptacle embodying this invention; and FIG. 2 is a plan view thereof.

DETAILED DESCRIPTION OF THE DRAWINGS

Figures 1, 2:
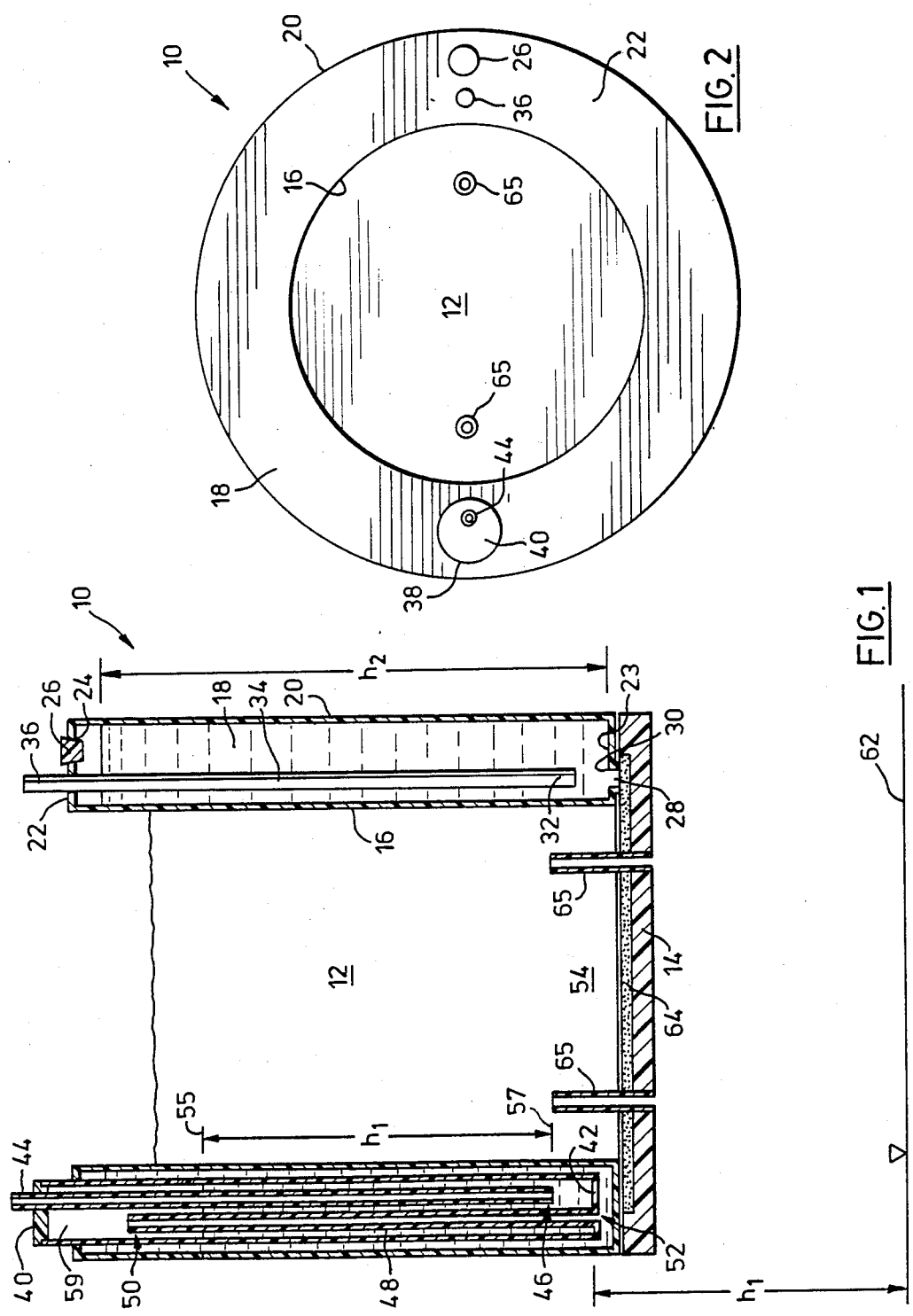

Attention is directed to the drawings, which show a plant receptacle generally at 10 having an internal chamber 12 defined at the bottom by a bottom wall 14, and defined laterally by a cylindrical wall 16. The cylindrical wall 16 defines the inner limit of an annular reservoir 18 of which the outer limit is defined by a further cylindrical wall 20. An annular top wall 22 and an annular bottom wall 23 seal the annular reservoir 18 from contact with the atmosphere. Located in the top wall 22 is a filling aperture 24 having a cap 26 for closing the same. In addition to the aperture 24, the reservoir 18 has a water supply opening 28 in the bottom annular wall 23. Within the reservoir 18 from the opening 28 is a member 30 which is adapted to sealingly receive the bottom end 32 of a shut-off rod 34, of which the top end 36 extends upwardly in sealing engagement through the top wall 22 of the reservoir 18.

Shown at the left of FIG. 1 is a series-coupled pressure reduction arrangement contained within a cartridge 38 which, in the embodiment shown, passes downwardly into and is partly immersed within the reservoir 18. The cartridge 38, in the embodiment shown, is a cylinder closed at the top by a removable cartridge filling cap 40, and closed at the bottom by a permanent wall 42. Extending through the cap 40 in sealed engagement is a tube 44 constituting a first conduit communicating the atmosphere with a first location 46 within the compartment defined by the cartridge 38. A further tube 48 constitutes a second conduit communicating a second location 50 within the compartment defined by the cartridge 38 with a location 52 in the reservoir 18 adjacent the lower region 54 of the chamber 12 constituting the plant receptacle. The second location 50 is above the first location 46, as can be seen in FIG. 1. The compartment defined by the cartridge 38 is adapted to contain water (or other liquid) to a level between the two locations 46 and 50, and in FIG. 1 the horizontal line 55 represents the upper surface of water within the cartridge 38.

It will be appreciated that, as water leaves the reservoir 18 through the opening 28, replacement air can only enter along a path including the tube 44, the cartridge 38 and the tube 48. In effect, air passes down the tube 44, bubbles up through the water in the cartridge 38, and then passes downwardly through the tube 48 to enter the reservoir 18 at the location 52, where it bubbles up to the top of the reservoir 18 to replace water lost through the opening 28. This means that, when the device is in operation, the tube 44 will be completely filled with air, which in turn means that the pressure within the liquid in cartridge 38 at the level 57 will be atmospheric. This in turn requires the pressure in the cartridge space 59 above the water level 55 to be below atmospheric by an amount equivalent to a water column of height $h_1$ in FIG. 1. This is the vertical distance between the level 57 and the level 55.

It will further be appreciated that the tube 48 is also completely filled with air when the device is in operation, which in turn requires the air pressure at the location 52 to be the same as the pressure within the top portion 59 of the cartridge 38. Since the air pressure in the portion 59 of the cartridge 38 is below atmospheric by an amount equivalent to a water column of height $h_1$, the effective water table level for the device as a whole is located at a distance $h_1$ below the location 52. In FIG. 1, the effective water table level is indicated by the line 62.

Because of the relationship just described, it will be understood that the pressure at the opening 28 is below atmospheric by a pressure differential approximately that of a water column of height $h_1$. In consequence, some means must be provided to prevent air from bubbling up into the reservoir 18 through the opening 28, while water runs freely out of the opening. This means is provided by a layer 64 which will be referred to hereinafter as a permeable membrane with a capillary action capable of retaining water against the effective suction at the opening 28. The permeable membrane thus constitutes capillary means at the bottom of the receptacle adjacent the opening, so that the opening 28 must communicate through the capillary means with the bottom of the receptacle. In scientific terminology, the permeable membrane could be described as a water wettable membrane having a bubbling pressure at least as great as the height of water represented by the distance by which the water surface 55 in the compartment of the cartridge 38 is above the location 46 (i.e. $h_1$), assuming the location 52 is at approximately the same horizontal level as the opening 28.

In the appended claims, the term "capillary means" is to be interpreted broadly, and can include a wettable material selected from the group comprising: fritted glass, porous plastic, nylon mesh, porous metal, a bed of glass beads or sand particles, or other suitable materials.

In the embodiment illustrated in FIG. 1, a bottom 14 includes ventilation tubes 65 extending through the bottom 14 and up into the growth medium (soil) within the chamber 12.

It will thus be seen that this invention has provided a receptacle for plants or the like, which establishes an effective water table below the bottom of the receptacle itself, thus providing a more suitable growth environment for the plant.

It is not essential for the entire periphery of the bottom 14 to be sealed against the bottom of the reservoir 18, since the pressure at the opening 28 is below atmospheric. What is important, however, is that the opening 28 itself be in tight engagement with the permeable membrane layer 64. In this manner, air cannot enter the reservoir 18 through the opening 28.

It should further be noted that the ventilation tubes 65, though advantageous, are not essential to the operation of the device. They merely improve aeration of the growth medium within the chamber 12 at the bottom of the receptacle.

Normal Operation

During normal operation of this device as a planter, water flow from the reservoir 18 into the growth medium in the chamber 12 is controlled by plant transpiration and by evaporation from the growth medium surface. As the plant and evaporation extract water from the growth medium, the deficit is replenished by flow out of the reservoir 18, down through the port 28, horizontally through the layer 64, and upwardly by capillarity into the growth medium. When the water demand is high, such as during a warm sunny day, the necessary flow occurs from the reservoir 18 to meet this demand. Conversely, when the water demand is virtually zero, for example during a cool night, virtually no water flows from the reservoir. To permit water flow out of the reservoir 18, air enters the reservoir through the cartridge 38 by passing through both tubes 44 and 48 in the manner described previously. In this manner, the plant is never moisture stressed, and the moisture status of the growth medium is maintained at near optimum levels for plant growth.

Essentially, this device operates by balancing capillary and vacuum forces. Extraction of water by the plant and by evaporation induces changes in capillary forces in the growth medium which draw water out of the reservoir 18 via the permeable layer 64. This in turn creates a vacuum in the air spaces at the top of the reservoir 18 and the cartridge 38. A balance is then established between the capillaric suction in the growth medium and the vacuums by the influx of air through the air tubes 44 and 48. This balance is regulated by the height of water in the cartridge, i.e. the vertical dimension shown as $h_1$. The greater this height, the greater the vacuums, and the greater the capillaric suction required to cause flow out of the reservoir 18. Increasing capillaric suction corresponds to a drier growth medium, and consequently the greater $h_1$, the drier the growth medium. When $h_1$ is 0, i.e. when the bottom of the tube 44 is not submerged in water, the growth medium at the base of the pot (within the chamber 12) is saturated. In effect, water is supplied to the growth medium as if the water table were at location 52.

As water is extracted by the plant and growth medium system and is replaced from the reservoir 18, the water level in the reservoir 18 falls. The water column in the reservoir 18 is shown as $h_2$ in FIG. 1. Although $h_2$ decreases with time, the water depth $h_1$ in the cartridge 18 remains constant, although there may be a slow decrease with time due to evaporation. Consequently, the moisture status in the growth medium also remains constant. The receptacle will continue to function as long as the bottom of the tube 48 remains submerged.

Refilling with Water

When the water level $h_2$ in the reservoir 18 falls to the bottom of the air tube 48, the reservoir 18 must be refilled if the receptacle is to continue to function. In order to refill, the rod 34 is first pushed down to close the supply opening 28, thus stopping flow of water from the reservoir 18 into the permeable layer 64. Next, the filling cap 26 is removed and the reservoir is filled with water, then the filling cap 26 is replaced, following which the rod 34 is pulled up and withdrawn from its closing relationship with the opening 28. This re-initiates the flow of water.

Initial Start-up

It is recommended that the permeable layer 64 be wetted up before any growth medium is added to the pot in the chamber 12. This is best accomplished by filling only the reservoir 18 with water initially, allowing the cartridge 38 to remain empty, or filling the cartridge with water and leaving cap 40 removed. The pot is then started using the sequence given in the previous section. This is carried out without any growth medium present. When the layer 64 is fully wetted, which should occur within a minute or two, the opening 28 is stopped using the rod 34, the cartridge 38 is filled with water to about the level shown, growth medium and plant are added, and the receptacle is re-started. It should be noted that this particular start-up procedure is not critical, and it is expected that the receptacle will operate properly regardless of the way in which it is started.

Water is added to the cartridge 38 by removing the airtight filling cap 40. The volume of water to be added depends on the desired depth $h_1$, which in turn depends on the desired wetness of the growth medium. The depth $h_1$ will therefore be dependent upon the type of plant grown, and simple guidelines can be readily established.

With regard to the permeable layer 64 (wettable membrane), this should contain only pore sizes that remain full of water under a water suction of $h_1 - h_3$ units of water head, where $h_3$ is the vertical distance between the location 52 and the top of the permeable layer 64. The upper limit of pore size is given by the expression $$d = 0.30/(h_1 - h_3)$$

where d is the pore diameter given in cm, and where $h_1$ and $h_3$ are expressed in cm of water head.

While one embodiment of this invention has been illustrated in the accompanying drawings and described hereinabove, it will be evident to those skilled in the art that changes and modifications may be made therein without departing from the essence of this invention, as set forth in the appended claims.

What we claim is:

1. In combination:
    means defining an upwardly open receptacle for plants or the like, said means including a bottom wall for the receptacle,
    a closed reservoir adjacent the receptacle, having an opening at the bottom in communication with the bottom region of the receptacle,
    and a compartment having a first conduit communicating the atmosphere with a first location within the compartment, and a second conduit communicating a second location within the compartment with a location in the reservoir adjacent the lower region of the receptacle, said second location being above said first location, said compartment being adapted to contain liquid to a level between the two said locations, the compartment being sealed from the atmosphere except for said first conduit.

2. The combination claimed in claim 1, in which the said opening communicates through capillary means with the bottom of the receptacle.

3. The combination claimed in claim 1, in which the compartment is within the reservoir.

4. The combination claimed in claim 1, in which the reservoir contains water and in which the compartment contains water to a level between said two locations, whereby the effective water table level in said receptacle is at a level which is below the said location in the reservoir by a distance equal to the distance by which the height of the water surface in the compartment is above said first location.

5. The combination claimed in claim 1, in which the reservoir is sealed from the atmosphere except for a closable filling aperture and except for said opening.

6. The combination claimed in claim 2, in which said capillary means is a water wettable membrane.

7. The combination claimed in claim 4, in which said capillary means is a water wettable membrane having a bubbling pressure at least as great as the height of water represented by the distance by which the water surface in the compartment is above said first location.

8. The combination claimed in claim 2, in which the capillary means is a wettable material selected from the group comprising: fritted glass, porous plastic, nylon mesh, porous metal, a bed of glass beads and a bed of sand particles.

9. The combination claimed in claim 4, which further includes at least one ventilation tube extending through the bottom wall of the receptacle.

10. The combination claimed in claim 5, which further includes means for stopping said opening in the reservoir whenever said filling aperture is opened for filling.

11. The combination claimed in claim 10, in which said means for stopping comprises a rod extending in sealed manner through a top wall of said reservoir in alignment with said opening in the reservoir, the rod being manually manipulable from outside the reservoir.

* * * * *